United States Patent Office 2,977,042
Patented Mar. 28, 1961

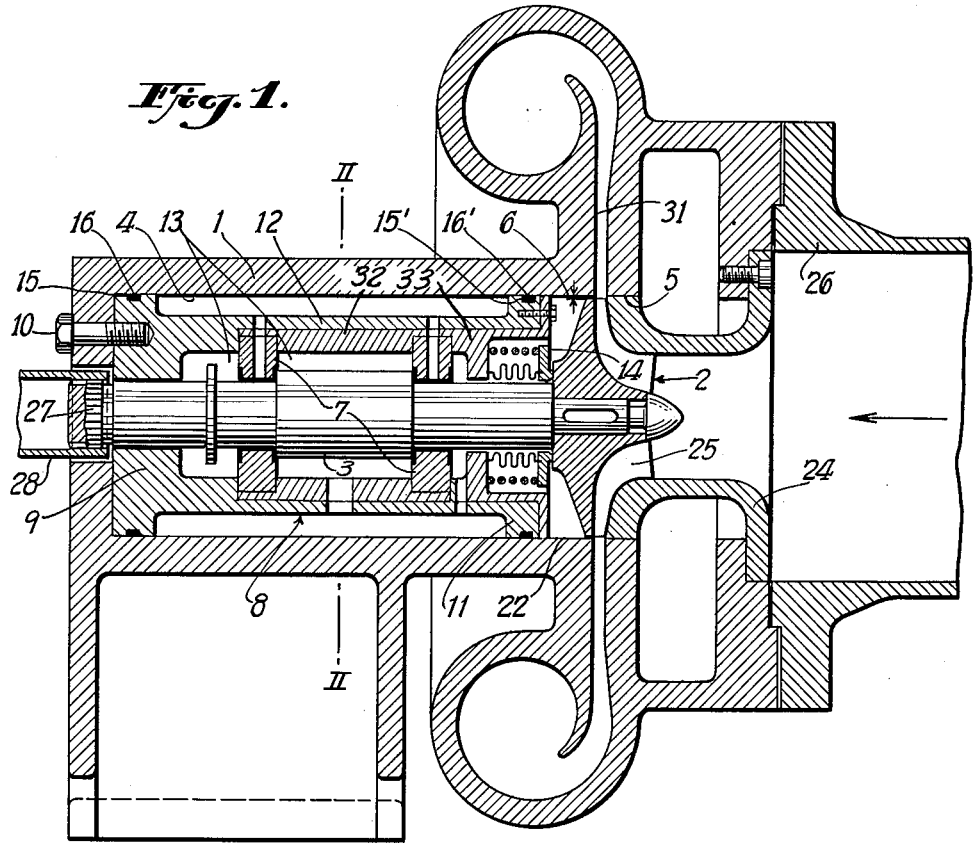
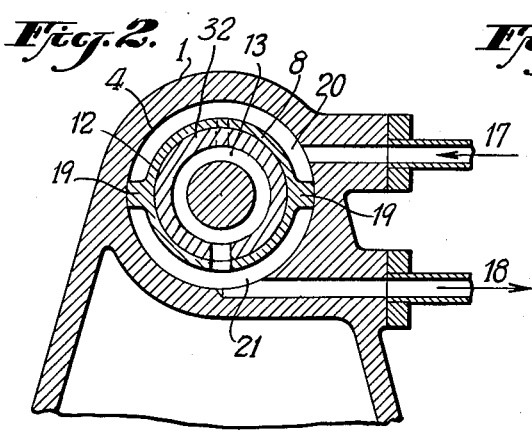
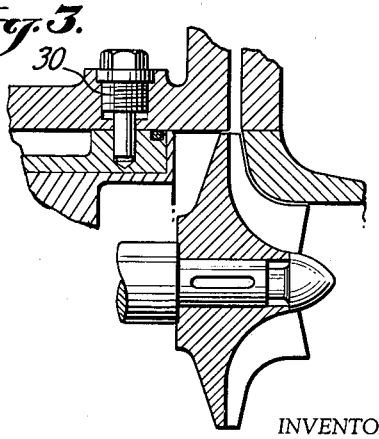

2,977,042

ONE-STAGE RADIAL COMPRESSOR

Kurt Jassniker, Winterthur, Switzerland, assignor to Sulzer Freres, S.A., Winterthur, Switzerland, a corporation of Switzerland Filed Nov. 26, 1958, Ser. No. 776,529

Claims priority, application Switzerland Dec. 13, 1957

4 Claims. (Cl. 230—127)

The present invention relates to an improved arrangement of a one-stage, single inlet radial compressor whose impeller is mounted on the end of the drive shaft.

In the compressor according to the invention the impeller, drive shaft, shaft bearings and seals form a unit which is inserted from the inlet or suction side into the compressor casing. The shaft bearings and seals are arranged within a common bearing housing which is received in a corresponding cavity in the compressor casing, the cavity being cylindrical at least adjacent to the impeller, and having a diameter thereat which is equal to the diameter of the impeller plus a suitable clearance. An annular inlet nozzle element is inserted into the aforesaid cavity outside of the impeller, the outside diameter of the nozzle element being at least as great as the diameter of the impeller, the inside diameter of the nozzle element corresponding to the inlet diameter of the impeller. The bottom of the cylindrical cavity which is distant from the impeller is provided with an aperture through which extends the drive shaft of the compressor.

In conventional pumps of this type the casing is usually split in an axial plane. For mounting and demounting the impeller or the bearings and the seal between the shaft and the bearing housing the axial joint of the compressor casing is opened. In another conventional design the interior of the machine is made accessible by providing a cover on the suction side of the casing. In this arrangement of a one-stage radial compressor the bearings and seals are placed in a cage forming part of the casing and placed on the driving end of the casing.

The conventional arrangements described in the paragraph next above are in many applications quite satisfactory with respect to manufacture and maintenance.

Pumps are known which have a casing which is not split in the axial direction, the pump being mounted on one side of the casing and connected with the driving means by a gear coupling.

It is an object of the present invention to provide, in a one-stage radial compressor, a self-contained group including the impeller, the drive shaft and the bearings and seals for the drive shaft which group can be inserted in the compressor casing from the suction side as a whole, i.e., as a single unit so that it can easily be removed for purposes of repair and interchange without undue waste of time.

This arrangement according to the invention is of particular importance for high speed compressors, especially for compressing organic refrigerating media, for example, of the Freon group, because in such compressors the bearings and seals are under high loads and maintenance of these parts is difficult. In a compressor for refrigeration which operates, for example, at 22,500 r.p.m., exchange of a shaft seal which is subject to wear or exchange of a bearing must be made in a very short time, if, for example, the preservation of great amounts of victuals in a refrigerator or the like depends on the operation of the compressor which in such cases cannot stand still longer than a predetermined period for making repairs.

In the arrangement according to the invention a self-contained structural unit consisting of impeller, shaft, bearings and seals is accessible from the suction side of the compressor casing and can be separated as a whole from the driving means and replaced by a new unit so that it is not necessary that a whole pump or compressor must be removed and replaced by a new one.

The advantages obtained with the arrangement according to the invention counterbalance the apparently complicated construction of the machine and cannot be obtained with conventional compressor structures. By reducing overhaul periods to a minimum and avoiding the necessity of having specially trained personnel, the invention makes it possible to use one-stage compressors of high capacity and relatively small weight in important branches of refrigeration engineering, for example, for cooling stored victuals, holds of ships, etc. Further advantages of the use of one-stage high capacity compressors are the considerable reduction of space requirement and of cost. These advantages are obtained by replacing a three-stage compressor as commonly used in plants of this type by a one-stage high capacity compressor which has much less weight and is much cheaper.

In a preferred design of the radial compressor according to the invention one end of the aforedescribed structural unit is connected to the compressor housing, the other end being free, permitting relative expansion and contraction of the unit and of the compressor housing.

It is of advantage to provide, in the outer periphery of the bearing housing, grooves in which elastic packings are inserted for sealing the cavity inside the compressor casing against the compressor without obstructing axial movement of the bearing housing in the compressor casing as caused, for example, by heat expansion.

It is also of advantage to extend the cylindrical cavity of the compressor casing beyond the suction side of the compressor and to insert a nozzle ring in the extended part of the cavity which ring forms the suction channel for the impeller. One end of this inlet nozzle ring is so connected with the compressor casing that the structural unit according to the invention can be pulled out of the compressor casing through the suction end portion of the casing after removal of a suction pipe, removal of the inlet nozzle ring and disconnection of the unit from the compressor casing.

The inlet nozzle ring may be used in combination with an open impeller and form a shroud for the impeller buckets.

The compressor shaft and the drive shaft may be connected by an axial claw coupling.

The novel features which are considered characteristic of the invention are set forth with particularity in the appended claims. The invention itself, however, and additional objects and advantages thereof will best be understood from the following description of embodiments thereof when read in connection with the accompanying drawing, in which:

Fig. 1 is an axial sectional view of a one-stage compressor according to the invention.

Fig. 2 is a radial sectional view of the compressor shown in Fig. 1, the section being made alone line II—II in Fig. 1.

Fig. 3 is a sectional view of a modified detail of the compressor shown in Fig. 1.

Referring more particularly to the drawing, numeral 1 designates a compressor casing, numeral 2 designating an impeller wheel which is mounted at the free end of a shaft 3. The casing 1 has a cylindrical cavity 4 whose diameter on the suction side of the casing 1 equals the diameter of the impeller wheel 2 plus twice the width of an annular clearance 6. The shaft 3 together with its bearings 7 and a bearing housing or inner casing 12 forms a unit 8 which, after assembly, is pushed through the suction end portion of the compressor casing into the cavity 4. The bearings 7 are split in a diametrical plane and are held axially apart by a sleeve 32. One end 9 of the housing 12 is connected by means of screws 10 with the bottom of the cavity 4, which bottom is distant from the impeller, the other end 11 of the housing being closed by a cover 33 and free to expand and contract in the axial direction. The self-contained structural unit 8 is provided with cavities 13, containing lubricant for the bearings 7, and a seal 14 connected to the cover 33 and separating the shaft 3 from the diffuser 31 of the pump. Peripheral portions of the bearing housing 12 are provided with annular grooves 15 and 15' in which packings 16 and 16', made of elastic material, are inserted. This arrangement affords free axial movement of one end of the unit 8 relative to the compressor casing 1, which is of advantage in the case of different heat expansion of different parts.

Numeral 24 designates an inlet nozzle mounted in the suction end portion of the compressor casing 1, in a cylindrical extension 5 of the cavity 4. The element 24 has a portion serving as a shroud for the buckets 25 of the open impeller 2. A suction pipe 26 is connected with the suction end of the casing 1 adjacent to the inlet end of the element 24.

The unit 8 can be pulled as a whole out of the suction end portion 22 of the cylindrical cavity 4 after removing the suction pipe 26, the inlet nozzle element 24 and the screws 10. This operation is facilitated because the shaft 3 has a toothed end which is axially inserted in a correspondingly toothed end of a hollow drive shaft 28. The so formed axial claw coupling 27 is easily disconnected by pulling one part of the coupling out of the mating part.

As seen in Fig. 2 the radial compressor according to the invention has another advantage because the supply of a cooling and lubricating fluid through an inlet 17 and an outlet 18 is effected without any additional assembly operation, simply by insertion of the structural unit 8 in the cavity 4. The bearing housing 12 is provided with ribs 19 between the seals 16 and 16', the ribs 19 forming a pocket 20 for admitting lubricant to the cavity 13 and a pocket 21 for removing the lubricant.

The present invention is not restricted to a compressor of the type shown. The seal 16, for example, could be arranged in the end of the bearing housing abutting against the bottom of the cavity 4. The connection of the structural unit 8 with the compressor casing could be effected by means of studs 30 extending through the casing 1 in a circumferential portion of the bearing housing 12 as shown in Fig. 3.

The ribs 19, of course, can be arranged in any desired position and the number or type of bearings can be different from those shown.

I claim:

1. A one-stage single-inlet radial compressor comprising, in combination, a one-piece outer casing having a cylindrical cavity, said outer casing having a wall portion closing one end of said cavity and having an aperture, an inner casing fitting into said cavity, a shaft extending through said inner casing coaxially of said cavity and having ends projecting from said inner casing, one of the projecting shaft ends extending into said aperture, bearings for said shaft mounted on said inner casing, an impeller mounted on the second of said projecting shaft ends adjacent to said inner casing and having an inlet side for the fluid to be compressed, said inlet side being distant from said inner casing, said cavity having an open inlet portion for admitting fluid to be compressed by the compressor, said impeller being located in said inlet portion and having an outer diameter equal to the diameter of said cavity minus a clearance for eliminating frictional contact between the impeller and said outer casing, sealing means connected to said inner casing and abutting against said impeller for sealing the interior of said inner casing against the outside thereof, a discharge passage for the fluid compressed by said impeller located entirely in said outer casing, and an annular inlet member fitted in said inlet portion and having an inside diameter substantially corresponding to the diameter of said impeller at the inlet side thereof, said inner casing, said bearings, said sealing means, said shaft and said impeller forming a self-contained structural unit adapted to be inserted into and removed from said cavity as a whole through said inlet portion after removal of said inlet member.

2. A one-stage single-inlet radial compressor as defined in claim 1 wherein said inner casing has an end wall connected to said wall portion of said outer casing and has a longitudinal wall axially slidably movable in said cavity.

3. A one-stage single-inlet radial compressor comprising a shaft having a free end, an impeller mounted on the free end of said shaft, bearings supporting said shaft, a bearing housing surrounding and connected to said bearings, sealing means connected to said housing and abutting against said impeller for sealing the interior of said housing against the outside, said shaft, said impeller, said bearings, said sealing means, and said bearing housing forming a self-contained structural unit, a compressor casing having a suction end portion, an outlet passage for the fluid compressed by said impeller entirely located in said casing, a cavity in said casing corresponding in shape to and adapted to receive said bearing housing and parts connected thereto through said suction end portion, said impeller being outside of and adjacent to said bearing housing, said cavity having a cylindrical wall at least where said impeller is located when said unit is inserted in the cavity, and having a diameter equal to the outer diameter of said impeller plus a clearance for avoiding frictional contact between said impeller and said casing, an annular inlet nozzle member fitted into said cavity at the suction end portion of said casing coaxially of and outside of said impeller, the outside diameter of said inlet nozzle member being at least as great as that of said impeller, and an inlet pipe for the fluid to be compressed connected to said suction end portion of said casing outside of said inlet member, whereby said unit can be removed as a whole from said casing after removal of said inlet pipe and of said inlet nozzle member.

4. A one-stage single-inlet radial compressor according to claim 3 wherein said impeller is of the open type and said inlet nozzle member forms a shroud for the buckets of said impeller.

References Cited in the file of this patent

UNITED STATES PATENTS

| 2,641,190 | Johnson | June 9, 1953 |
| 2,763,214 | White | Sept. 8, 1956 |
| 2,864,314 | Culleton | Dec. 16, 1958 |
| 2,865,298 | Brill | Dec. 23, 1958 |
| 2,865,299 | Hornschuch et al. | Dec. 23, 1958 |

FOREIGN PATENTS

| 751,696 | Great Britain | July 4, 1956 |